(12) United States Patent
Liao et al.

(10) Patent No.: US 7,596,695 B2
(45) Date of Patent: Sep. 29, 2009

(54) APPLICATION-BASED DATA ENCRYPTION SYSTEM AND METHOD THEREOF

(75) Inventors: Wen-Chiuan Liao, Hsinchu (TW); Jun-Bin Shi, Dounan Township (TW)

(73) Assignee: Industrial Technology Research Institute, Hsinchu (TW)

( * ) Notice: Subject to any disclaimer, the term of this patent is extended or adjusted under 35 U.S.C. 154(b) by 682 days.

(21) Appl. No.: 10/981,127

(22) Filed: Nov. 4, 2004

(65) Prior Publication Data

US 2005/0278527 A1 Dec. 15, 2005

(30) Foreign Application Priority Data

Jun. 10, 2004 (TW) .............................. 93116656 A

(51) Int. Cl.
*H04L 29/06* (2006.01)
(52) U.S. Cl. ............................. 713/165; 380/44; 726/7
(58) Field of Classification Search ................ 707/204; 380/28, 37, 277, 44, 259; 713/175, 200, 713/165, 194; 726/7
See application file for complete search history.

(56) References Cited

U.S. PATENT DOCUMENTS

| | | | |
|---|---|---|---|
| 4,780,905 A * | 10/1988 | Cruts et al. ................. 380/44 |
| 5,584,023 A * | 12/1996 | Hsu ........................... 707/204 |
| 5,757,908 A * | 5/1998 | Cooper et al. ............... 713/165 |
| 6,185,681 B1 | 2/2001 | Zizzi ........................... 713/165 |
| 6,249,866 B1 | 6/2001 | Brundrett et al. ............ 713/165 |
| 6,259,789 B1 * | 7/2001 | Paone .......................... 380/28 |
| 6,363,486 B1 * | 3/2002 | Knapton, III ................. 726/7 |
| 7,200,760 B2 * | 4/2007 | Riebe et al. .................. 713/194 |
| 7,221,757 B2 * | 5/2007 | Alao ........................... 380/37 |
| 2003/0123667 A1 * | 7/2003 | Weber et al. ................ 380/277 |
| 2004/0057579 A1 * | 3/2004 | Fahrny ........................ 380/44 |
| 2004/0091114 A1 * | 5/2004 | Carter et al. ................. 380/259 |
| 2004/0172538 A1 * | 9/2004 | Satoh et al. .................. 713/175 |
| 2005/0125684 A1 * | 6/2005 | Schmidt ...................... 713/200 |
| 2005/0235145 A1 * | 10/2005 | Slick et al. ................... 713/165 |
| 2005/0278527 A1 * | 12/2005 | Liao et al. .................... 713/165 |

OTHER PUBLICATIONS

"Linux Encryption HOWTO" by Marc Mutz, v0.2.2; Oct. 4, 2000.*

Title :A parallel algorithm for determining the inverse of a matrix for use in blockcipher encryption/decryption. Source :Journal of Supercomputing, {J-Supercomput-Netherlands}, Feb. 2007, vol. 39, No. 2, p. 113-30, 20 refs, CODEN: JOSUED, ISSN: 0920-8542. Publisher: Kluwer Academic Publishers, Netherlands.*

Title :ID-based threshold decryption secure against adaptive chosen-ciphertext attack. Source :Computers and Electrical Engineering, {Comput-Electr-Eng-UK}, May 2007, vol. 33, No. 3, p. 166-76, 20 refs, CODEN: CPEEBQ, ISSN: 0045-7906. Publisher: Elsevier, UK.*

(Continued)

*Primary Examiner*—Kambiz Zand
*Assistant Examiner*—Monjour Rahim
(74) *Attorney, Agent, or Firm*—Thomas, Kayden, Horstemeyer & Risley

(57) ABSTRACT

An application-based data encryption method implemented in an operating system. When receiving system calls for writing data opened by an application, the operating system encrypts the data utilizing an encryption key. When receiving system calls for reading data requested by the application, the operating system decrypts the data utilizing a decryption key. The encryption key and the decryption key may be the same key or two different keys.

24 Claims, 9 Drawing Sheets

OTHER PUBLICATIONS

Gerald J. Popek; Encryption and Secure Computer Networks; Computing Surveys, vol. 11, No. 4, Dec. 1979; pp. 1-16.*

"Linux Encryption How To" Mutz; 2000; http://encryptionhowto.sourceorge.net/Encryption-HOWTO-1.html.

* cited by examiner

APPLICATION-BASED DATA ENCRYPTION SYSTEM AND METHOD THEREOF

BACKGROUND

The invention relates to data encryption, and in particular to a method of encrypting data utilizing an operating system according to the state of the application and supervisory definition.

With popularity of Internet and intranet, and usage of portable memory devices, document security has become a significant issue.

U.S. Pat. No. 6,249,866 discloses a data encryption method employing designation of a directory or a file to be encrypted. Any user, however, can demand the designation. In addition, encryption and decryption keys can be provided by any user. Thus, general users can easily obtain or copy plain text data without requiring authorization.

A document "Linux Encryption HOWTO" by Marc Mutz discloses a data encryption method wherein a security disk volume is presented.

In the method, encryption and decryption keys are obtained by general users. When sharing encrypted files, it is necessary to disclose and share decryption keys to other users for access to the encrypted files. With the decryption keys, other users can easily decrypt the encrypted files stored in the security disk volume. Thus, the method cannot prevent risks to critical data.

In addition, if encrypted data in the security disk volume is copied to another volume, the data is first decrypted to plain text data.

U.S. Pat. No. 6,185,681 discloses another data encryption method providing encryption to electronic document management (EDM) systems without updating original EDM systems. A crypto server disclosed in the patent is responsible for the encryption functions.

FIG. 1 is a schematic diagram of the method. Memory a100 comprises application a11, EDM system a12, and crypto server a13. When application a11 issues commands comprising "close", "save" or "save as" for a file, crypto server a13 saves corresponding events and determines whether to encrypt the file. If the file is to be encrypted, crypto server a13 encrypts the file and provides encrypted file to EDM a12. EDM a12 then performs corresponding "close", "save" or "save as" operations for the encrypted file. When application a11 issues an "open" command for a file, crypto server a13 saves corresponding events and determines whether to decrypt the file. If the file is to be decrypted, crypto server a13 decrypts the file and provides the decrypted file to EDM a12. EDM a12 then performs the corresponding "open" command for the decrypted file.

Application a11 and EDM a12 must conform to open document management API (ODMA) standard. If application a11 or EDM a12 does not conform to the ODMA standard, crypto server a13 cannot save above-described events. In addition, crypto server a13 may be removed without affecting the entire EDM system a12 and operation thereof. If crypto server a13 is removed, files managed by EDM system a12 cannot be automatically encrypted.

Hence, there is a need for a new data encryption method to ameliorate the problems described above.

SUMMARY

Accordingly, an embodiment of the invention provides an application-based data encryption method, implemented in an operating system. Data opened by an application is encrypted utilizing an encryption key in response to each system call received by the operating system for storing data. Data requested by the application is decrypted utilizing a decryption key in response to each system call received by the operating system for reading data. The encryption key and the decryption key may comprise the same or two different keys.

Additionally, applications may be designated to a secure state. When receiving a data write or read system call, encryption and decryption are automatically performed in respective response to the write and read system call only if an application issuing the system call is in the secure state.

An embodiment of the invention also provides an application-based data encryption system comprising an operating system. The operating system comprises a crypto driver. The crypto driver encrypts data opened by an application utilizing an encryption key when the operating system receives any system call for storing data. The crypto driver decrypts data requested by the application utilizing a decryption key when the operating system receives any system call to read the data. The encryption key and the decryption key may comprise the same or two different keys.

An embodiment of the invention may further comprise a program security utility. The program security utility designates applications assuming a secure state. When receiving a data write or read system call, an operating system automatically performs encryption and decryption in respective response to the write and read system call only if the application issuing the system call is in the secure state.

DESCRIPTION OF THE DRAWINGS

The invention can be more fully understood by reading the subsequent detailed description and examples with references made to the accompanying drawings, wherein.

DETAILED DESCRIPTION

The invention provides an application-based data encryption method and system capable of encrypting data using an operating system according to the state of the application and supervisory definition.

Figure 1:
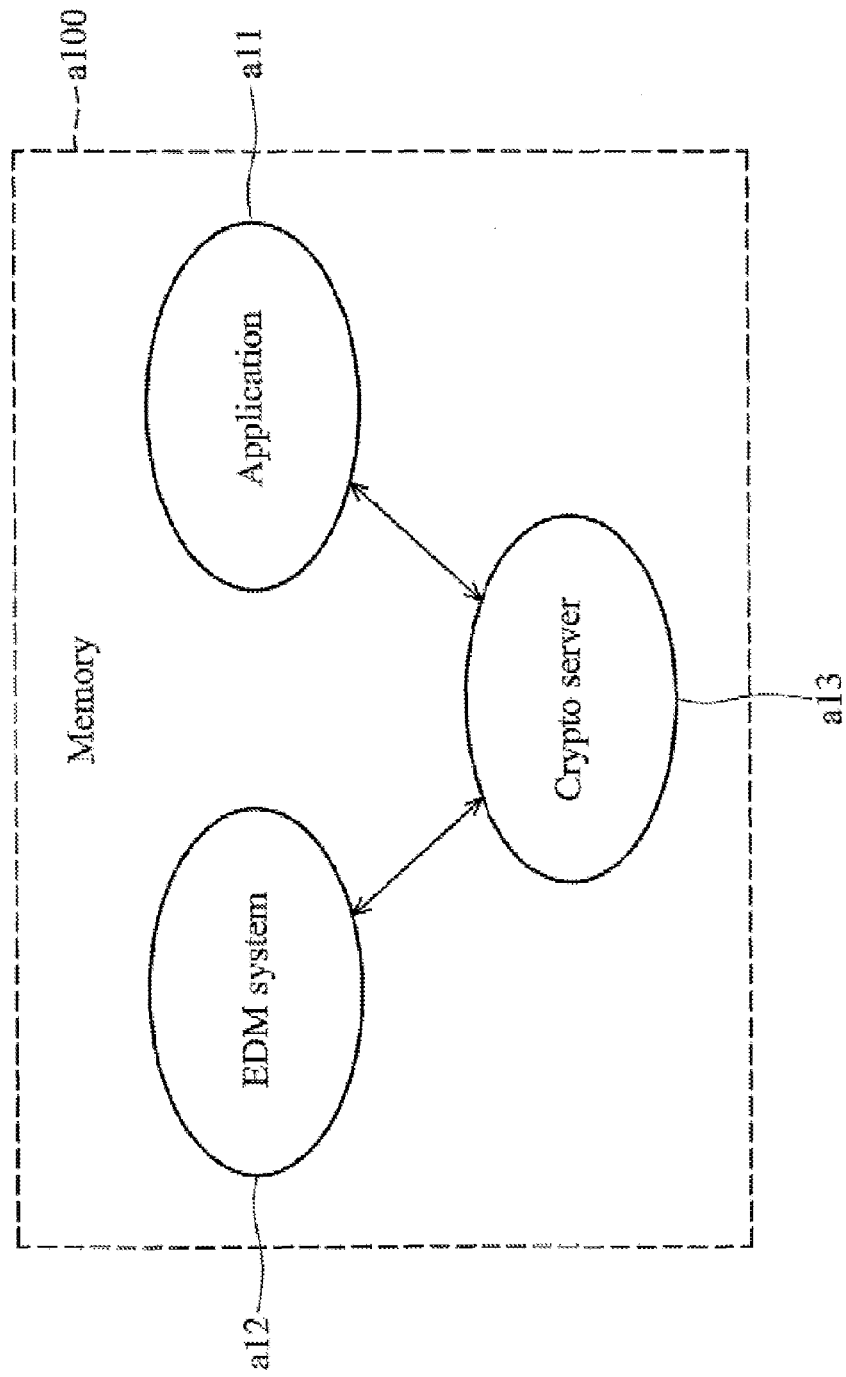
FIG. 1 is a schematic diagram of a conventional data encryption method.
Figure 2:
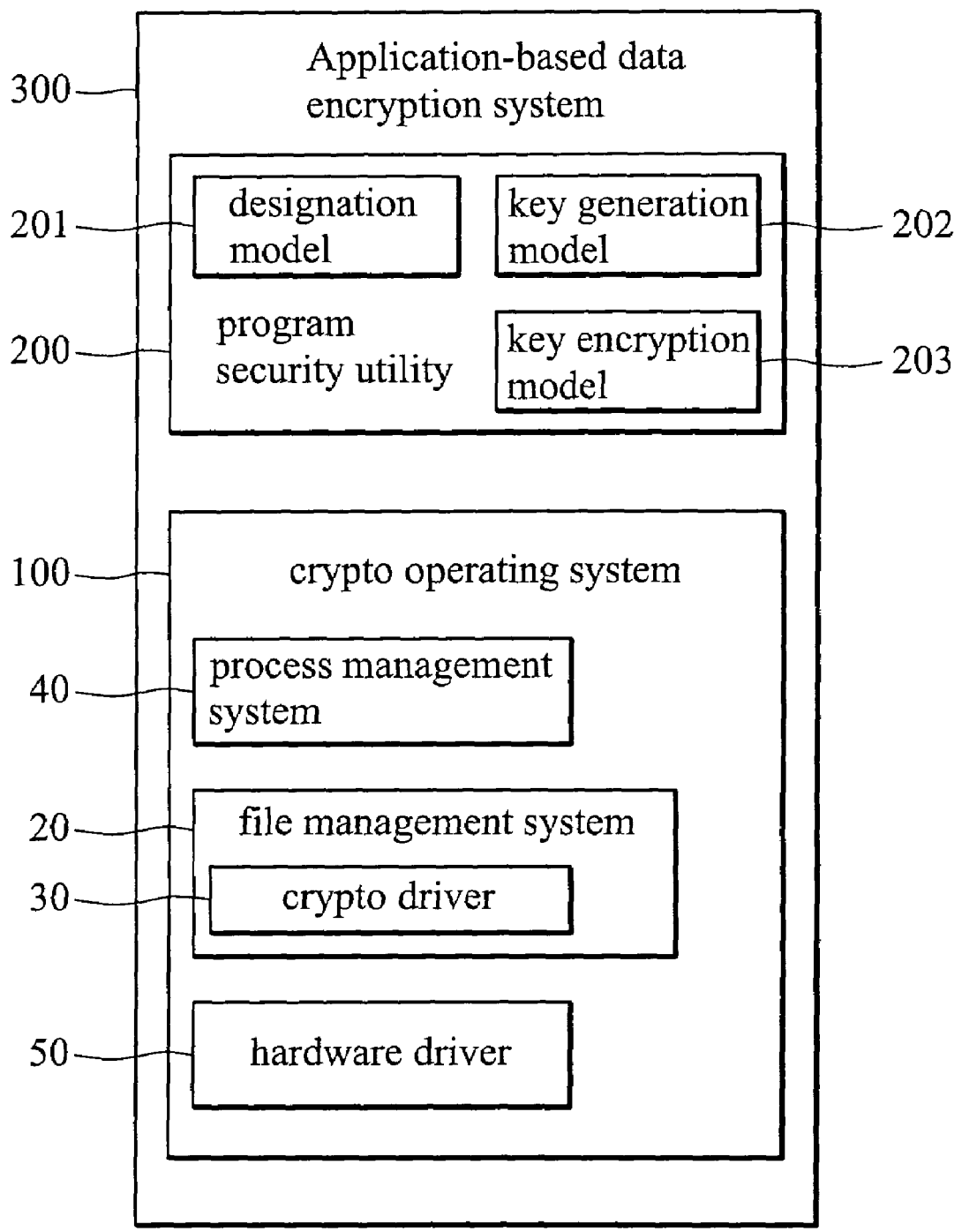
FIG. 2 is a schematic diagram of an application-based data encryption system of an embodiment of the invention.

In FIG. 2, application-based data encryption system 300 comprises a program security utility 200 and a crypto operating system 100.

Program security utility 200 comprises a designation model 201, key generation model 202 and key encryption model 203. Designation model 201 assigns an application a secure state. Key generation model 202 generates application keys for applications. Key encryption model 203 encrypts application keys.

Crypto operating system 100 comprises a file management system 20, a crypto driver 30, a process management system 40 and hardware driver 50. File management system 20 manages file systems. Crypto driver 30 encrypts data output to an input/output device and decrypts data input from the input/output device. Process management system 40 manages processes in crypto operating system 100. Hardware driver 50 drives the input/output device. The input/output device may comprise a hard disk drive, a disc drive, a floppy disk drive, a network attached disk drive, or other storage device. Crypto driver 30 may be included in file management system 20 or integrated into crypto hardware.

Program security utility 200 assigns an application a secure state. Crypto operating system 100 is capable of managing cipher text or plain text files. Specifically, crypto operating system 100 is capable of encrypting data opened by an application before storage to a device or decrypting encrypted data requested by the application after the encrypted data is read from the storage device according to the state of the application. File management system 20 instructs crypto driver 30 to perform encryption or decryption.

Figure 3:
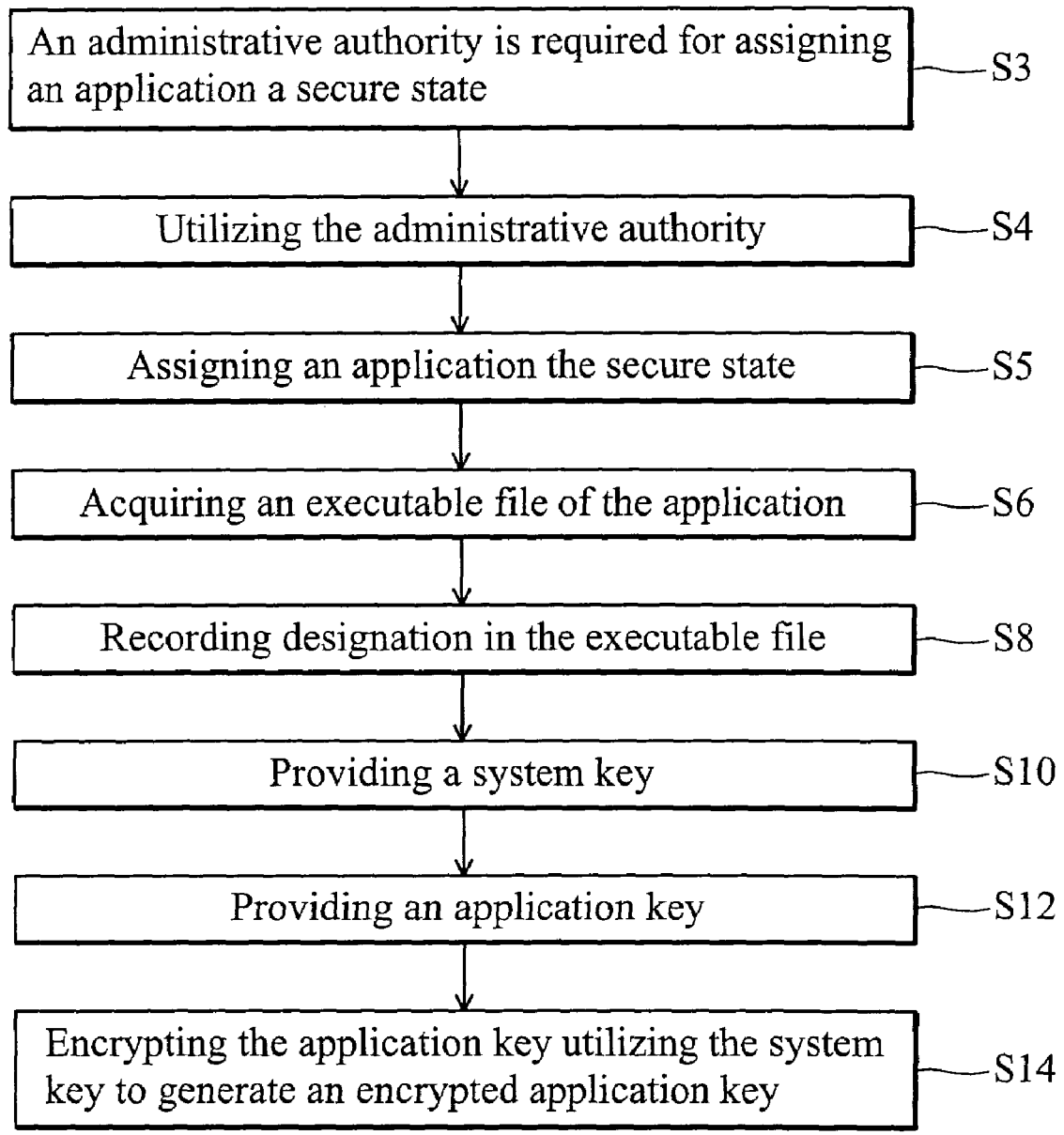
FIG. 3 is a flowchart of secure state designation performed by a program security utility according to an embodiment of the invention.

FIG. 3 is a flowchart of operation of program security utility 200, which may comprise a portion of crypto operating system 100, an application or a portion thereof. Program security utility 200 requires that all procedures related to assigning an application the secure state must be performed utilizing a supervisory authority (step S3) from an administrator. Users other than the administrator are referred to as general users. Program security utility 200 allows the administrator to instruct all procedures related to designating an application to the secure state (step S4). User authentication and limitation may be implemented automatically by crypto operating system 100 or manually by administrative personnel.

An administrator uses program security utility 200 to assign an application the secure state (step S5). Program security utility 200 acquires an executable file of the application (step S6) and records designation in the executable file (step S8), assigning a secure status. The designation information can comprise an encryption bit in the header of the executable file in which value, for example, "0" assigns non-secure state and value "1" secure state.

Additionally, a cipher text record (not shown) may store identification of applications in the secure state and encryption and decryption keys corresponding thereto. In this case, crypto operating system 100 loads the cipher text record. When I/O operations for write or read occur, crypto driver 30 retrieves information stored in the cipher text record to determine whether the applications are in the secure state and acquire corresponding encryption and decryption keys. Crypto driver 30 may determine whether to perform encryption or decryption in response to the I/O operations issued by the application utilizing the cipher text record. Encryption and decryption are performed utilizing encryption and decryption key stored in the cipher text record if necessary. The encryption key and the decryption key may comprise the same or two different keys according to employed cryptography architecture.

Figure 4:
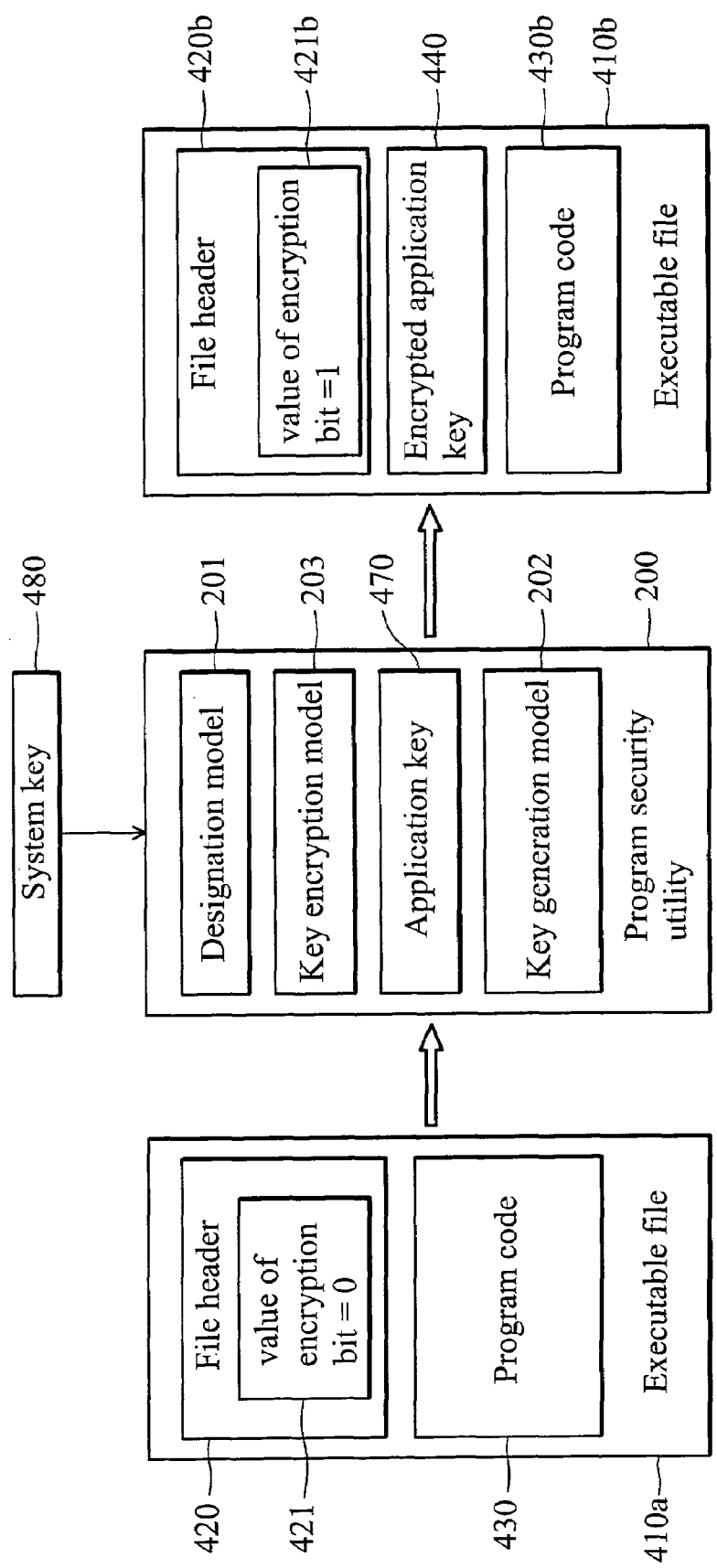
FIG. 4 is a schematic diagram of secure state designation in an embodiment of the invention.

In FIG. 4, executable file 410a is a disk image file of an application not designated, and comprises file header 420 and program code 430. File header 420 comprises an encryption bit 421, the value of which is "0". Program security utility 200 processes executable file 410a to generate executable file 410b.

Executable file 410b comprises file header 420b, program code 430b and encrypted application key 440. Content of program code 430b is the same as that of program code 430. Value of encryption bit 421b included in file header 420b has been designated as "1" by designation model 201.

System key 480 is provided to crypto operating system 100 for decrypting encrypted application key 440 (step S10) can be saved as a file or in a memory device. System key 480 may be provided by program security utility 200 or others. For example, system key 480 and application key 470 may be embedded keys of crypto operating system 100.

Key generation model 202 provides application key 470 (step S12). Key encryption model 203 encrypts application key 470 utilizing system key 480 to generate encrypted application key 440 (step S14). Data access by the application of executable file 410a is encrypted or decrypted utilizing application key 470 decrypted from encrypted application key 440. System key 480 and application key 470 conform to symmetric cryptography and can be used as encryption and decryption keys, but are not limit thereto. For example, when conforming to asymmetric cryptography, at least system key 480 or application key 470 may comprise an encryption key and a decryption key.

Thus, only an administrator can assign an application the secure state and maintain application key 470 and system key 480. General users cannot easily obtain or change application key 470 and system key 480 and cannot cancel the security designation.

Program security utility 200 can designate crypto operating system 100 to the secure state. If in the secure state, crypto operating system 100 performs corresponding encryption or decryption operations for all output or input data of all applications.

Figure 5:
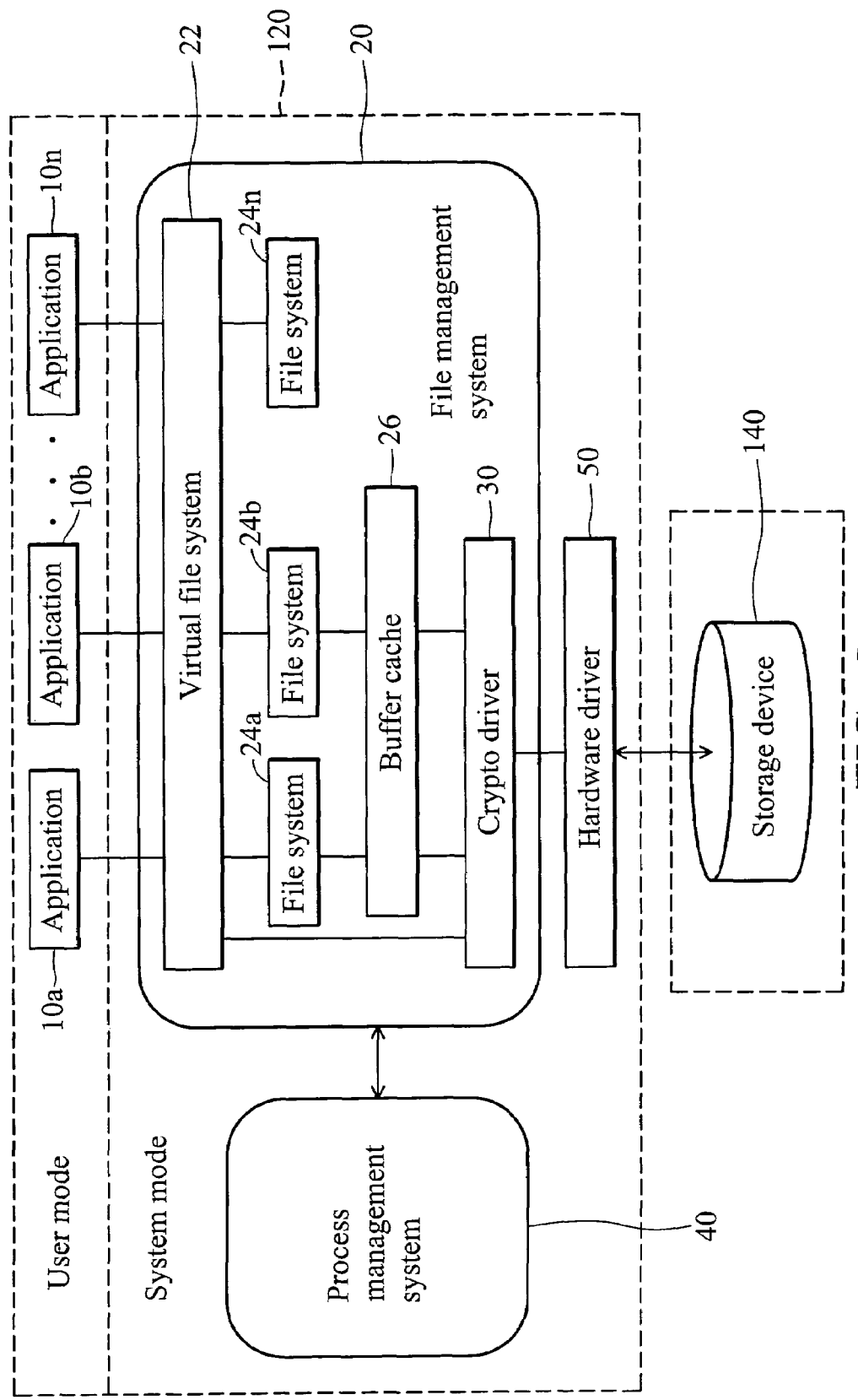
FIG. 5 is a schematic diagram of a computer system in an embodiment of the invention.

In FIG. 5, memory 120 comprises a plurality of applications 10a~10n in a user mode and crypto operating system 100 in a system mode. Applications 10a~10n comprise applications loaded in main memory 120 and executed by the computer system while crypto operating system 100 is shown in a Linux-based or UNIX-based framework, the application-based data encryption method of the invention may be implemented in other operating systems.

Application 10a comprises application of executable file 410a. Description of loading application 10a is shown in given by referring to FIG. 4 to 7.

Figure 6:
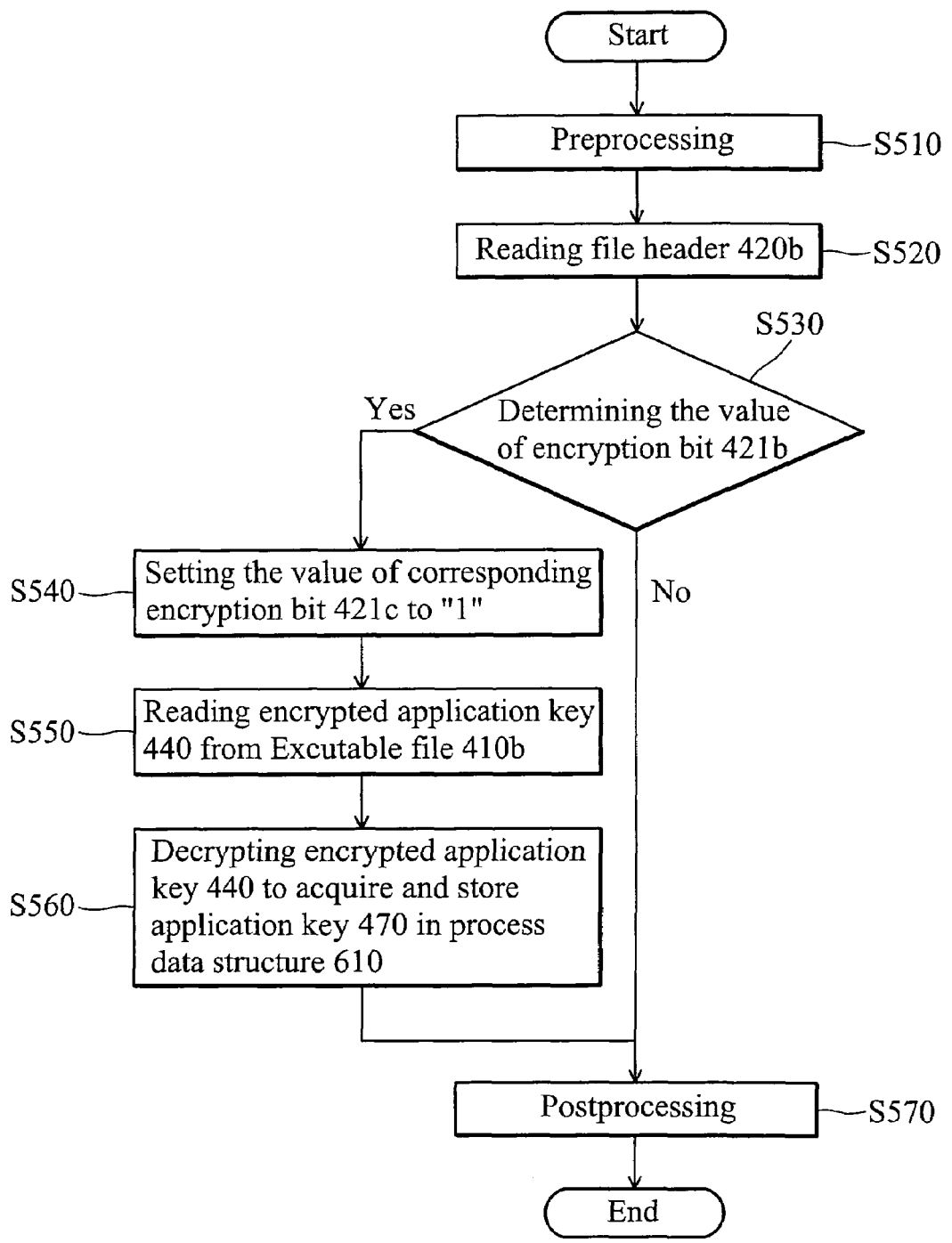
FIG. 6 is a flowchart of executable file loading according to an embodiment of the invention.
Figure 7:
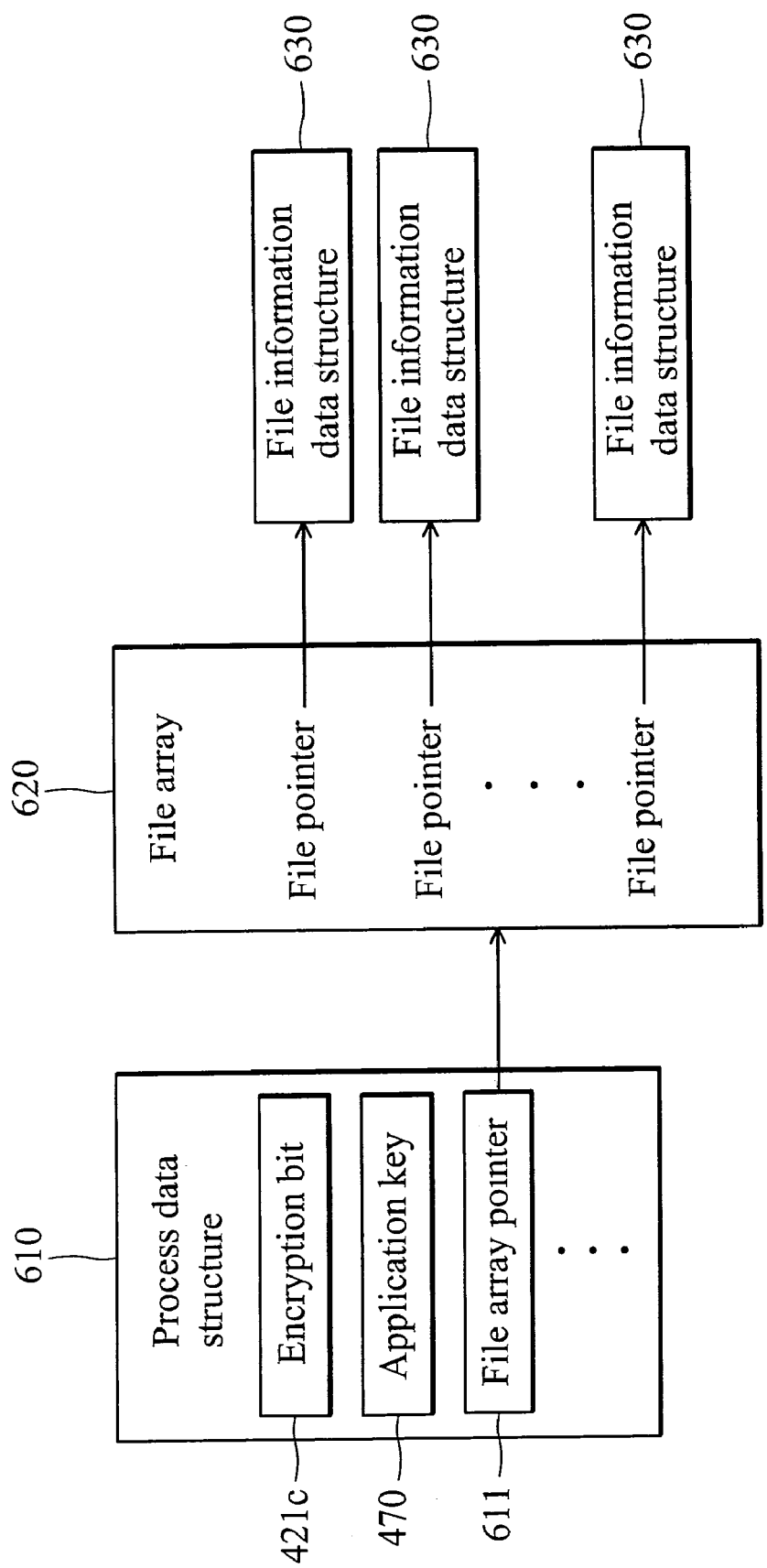
FIG. 7 is a schematic diagram of runtime data structure of an application in an embodiment of the invention.

In FIG. 6, first, process management system 40 performs loading preprocessing (step S510) allocating run time data structure of application 10a, as shown in FIG. 7.

FIG. 7 is a schematic diagram of runtime data structure of application 10a, in which process data structure 610 comprises encryption bit 421c, application key 470, and file array pointer 611. Application key 470 is used by crypto driver 30 for decrypting data after reading from storage device 140 or for encrypting data before storage in storage device 140. File array pointer 611 records address of file array 620. File array 620 records address of file information data structure 630 comprising all files opened, read, or written by the run time process of process data structure 610. File information data structure 630 enables file management system 20 to calculate addresses of files in storage device 140 required for reading or writing the files.

After load preprocessing, process management system 40 reads file header 420b (step S520) and determines the value of encryption bit 421b to record corresponding designation information in process data structure 610 (step S530). If encryption bit 421*b* is "1", executable file 410*b* is in the secure state. Thus, process management system 40 sets the value of corresponding encryption bit 421*c* in process data structure 610 to "1" (step S540), reads encrypted application key 440 from executable file 410*b* (step S550) and decrypts encrypted application key 440 using system key 480 to acquire and store application key 470 in process data structure 610 (step S560). Application key 470, however, may be stored in other data structure. Encrypted application key 440 may not be decrypted until encryption or decryption.

If encryption bit is "0", process management system 40 directly performs loading postprocessing to allocate memory capacity for application 10*a* (step S570).

When applications 10*b*~10*n* are not assigned the secure state, input and output operations thereof are performed as if crypto driver 30 is not present. If application 10*a* has been assigned the secure state, input and output operations of applications 10*a* activate decryption or encryption accordingly.

Virtual file system 22 in FIG. 5 provides a standardized file operation interface through which file operations, such as open, read, write, or lseek operations, are conveyed to dedicated file systems. File systems 24*a*~24*n* is responsible for managing allocation, storage or access of files in specific volumes of storage device 140. Different file systems may provide different file management mechanisms. File systems 24*a*~24*n* must calculate the address of a data set in storage device 140 before writing or reading thereof. Hardware driver 50 controls hardware for actual data input or output. Crypto driver 30 decrypts data for read requests before providing the data to an application requesting the data and encrypts data for write requests before passing the data to hardware driver 50. Buffer cache 26 is responsible for temporarily storing data to increase efficiency of file systems 24*a*~24*n*. Process management system 40 provides encryption and decryption keys to crypto driver 30.

Figure 8:
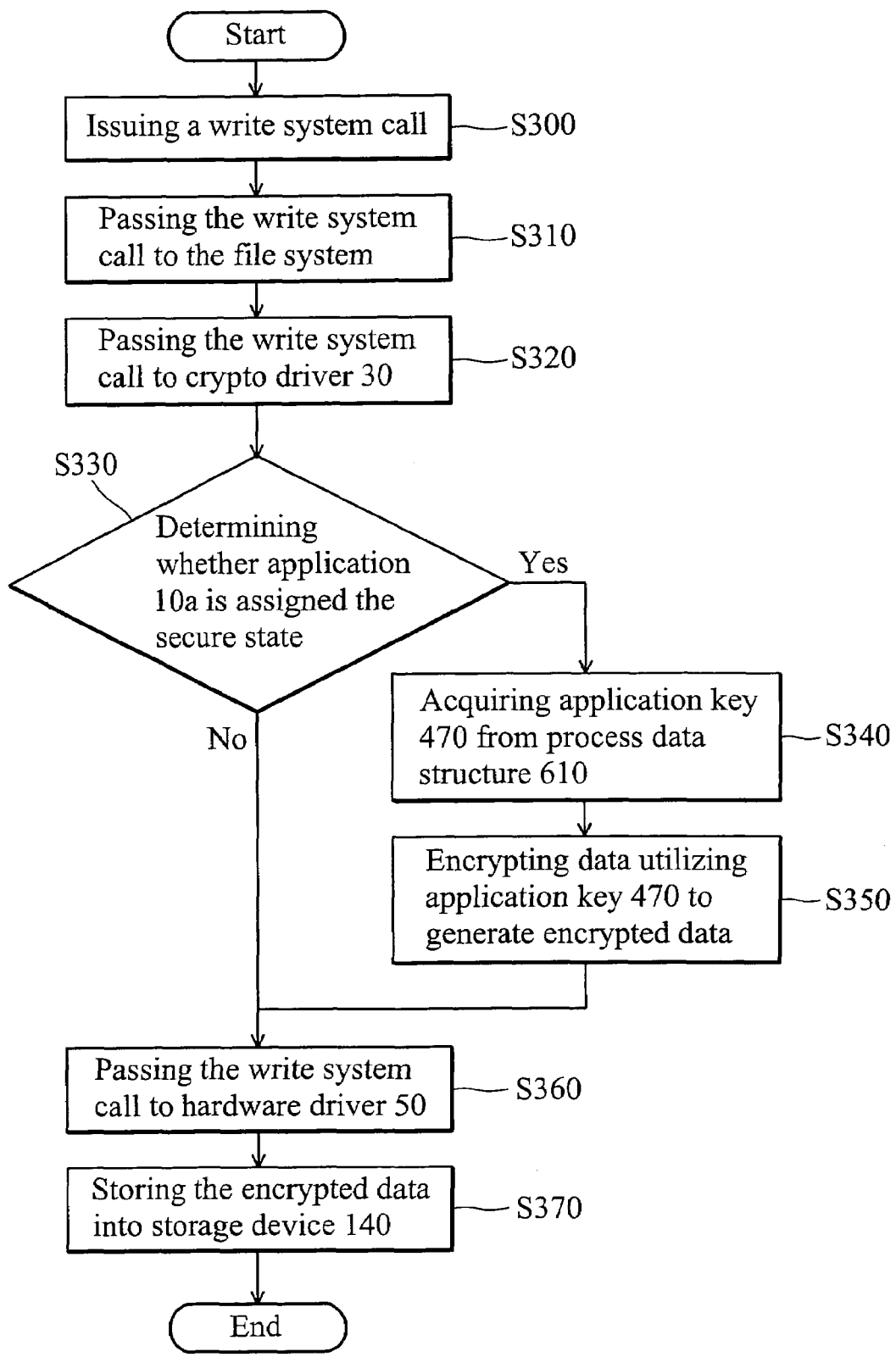
FIG. 8 is a flowchart of data writing of the application-based data encryption method according to an embodiment of the invention.

FIG. 8 is a flowchart of data writing steps, including auto encryption. First, application 10*a* passes a write request to file management system 20 via a write system call (step S300). The write system call is issued to write a data set to storage device 140. Virtual file system 22 of file management system 20 determines the file system to which the data set belongs and then passes the write request to the file system (step S310). The file system 24 calculates the address of the data set in storage device 140 based on file information data structure 630 and passes the write request to crypto driver 30 (step S320). Crypto driver 30 identifies encryption bit 421*c* to determine whether application 10*a* is assigned the secure state (step S330). If application 10*a* is assigned the secure state, the data set is determined to be encrypted before written into storage device 140, and step S340 is performed. If not, step S360 is performed directly. Crypto driver 30 acquires application key 470 from process data structure 610 (step S340) and encrypts the data set utilizing application key 470 to generate a encrypted data set (step S350). Crypto driver 30 passes the write request to hardware driver 50 (step S360). Hardware driver 50 stores the encrypted data set into storage device 140 (step S370), completing auto encryption process in response to the write system call.

Figure 9:
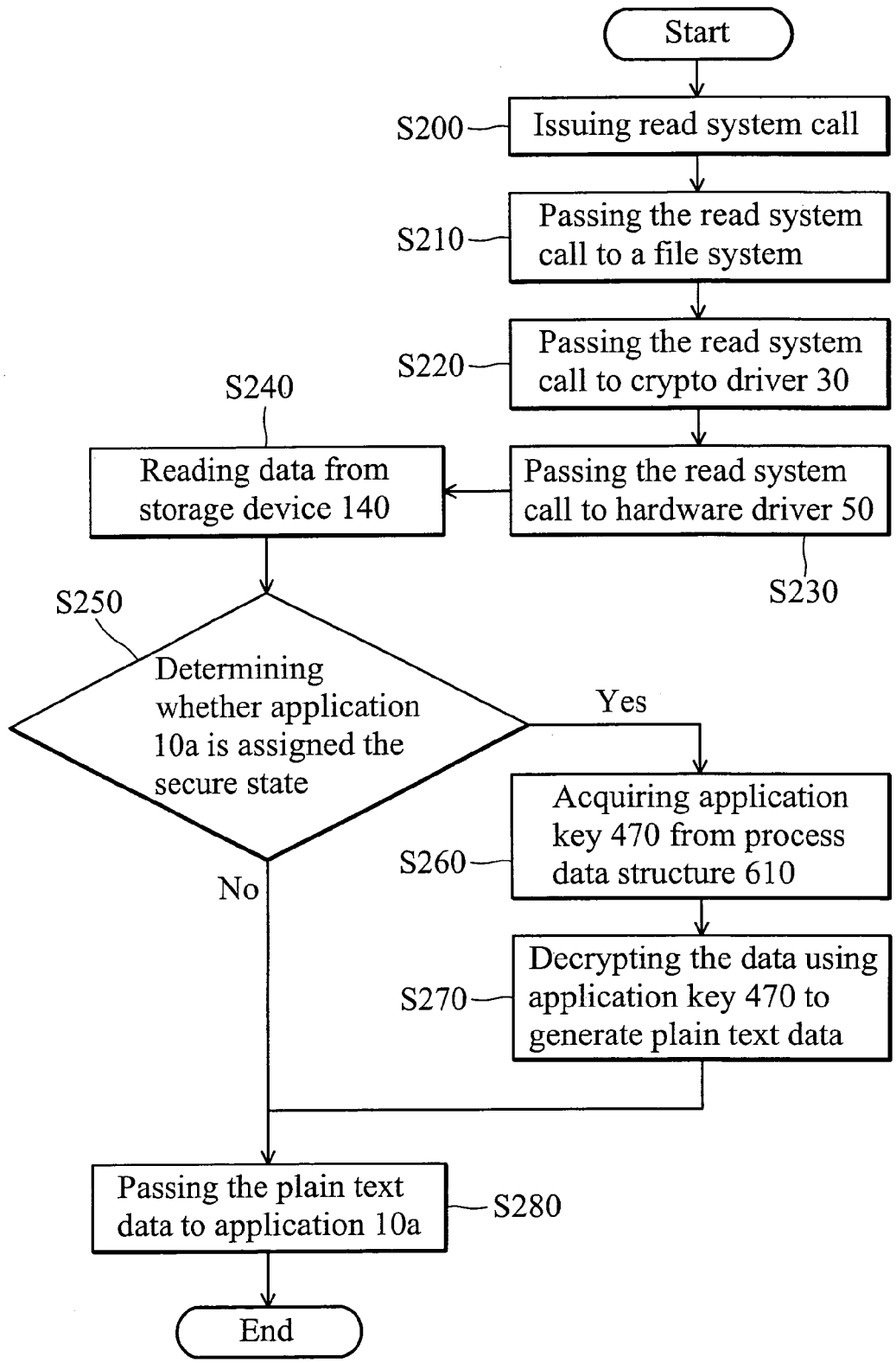
FIG. 9 is a flowchart of data reading of the application-based data encryption method according to an embodiment of the invention.

FIG. 9 is a flowchart of data reading steps including auto decryption. First, application 10*a* passes a read request to file management system 20 via a read system call (step S200). The read system call is issued to read a data set from storage device 140. Virtual file system 22 of file management system 20 determines the file system to which the data set belongs and passes the read request to the file system (step S210). The file system calculates the address of the data set in storage device 140 based on file information data structure 630 and passes the read request to crypto driver 30 (step S220). Crypto driver 30 passes the read request to hardware driver 50 (step S230). Hardware driver 50 reads the data set from storage device 140 into buffer cache 26 (step S240). Crypto driver 30 identifies encryption bit 421*c* to determine whether application 10*a* is assigned the secure state (step S250). If application 10*a* is assigned the secure state, the set of data is determined to be cipher text and determined to be decrypted, and step S260 is performed. If not, step S280 is performed directly. Crypto driver 30 acquires application key 470 from process data structure 610 (step S260) and decrypts the data set using application key 470 to generate a plain text data set (step S270). Crypto driver 30 passes the plain text data set to file management system 20. File management system 20 provides the plain text data set to application 10*a* (step S280), completing auto decryption in response to the read system call.

The invention can be implemented in devices, such as computers, Network Attached Storage (NAS), Storage Area Network (SAN), or others, such as digital cameras or video game devices.

While the invention has been described by way of example and in terms of the preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. An application-based data encryption system, comprising:
 a first executable file, further comprising a first file header and a first program code, wherein the first file header comprises a first encryption bit;
 a second executable file, further comprising a second file header, a second program code, and an encrypted application key, wherein the second file header comprises a second encryption bit;
 a system key;
 a program security utility, further comprising:
  a key generation model, providing an application key; and
  a key encryption model, encrypting the application key utilizing the system key to generate the encrypted application key;
 wherein the program security utility processes the first executable file to generate the second executable file; and
 a crypto operating system, decrypting the encrypted application key using the system key, further comprising:
  a file management system, further comprising:
   a virtual file system, when the file management system receives a write system call corresponding to an application, determining a file system to which a file to be written for the application belongs and then passing a write request to the determined file system; and
   a file system, when the write request is received, calculating a specified address of the file to be written in a storage device based on a file information data structure corresponding to the application and passing the write request;
  a crypto driver, receiving the write request from the file system, identifying an encryption bit of a process data structure corresponding to the application to determine whether the application is assigned a secure state, acquiring the application key from the process data structure if the application is assigned the secure state, and encrypting the file to be written utilizing the application key to generate an encrypted file; and hardware driver, retrieving the write request from the crypto driver and writing the encrypted file into the specified address of the storage device.

2. The system as claimed in claim 1, wherein the first encryption bit is "0".

3. The system as claimed in claim 1, wherein the first executable file is a disk image file of an application not designated.

4. The system as claimed in claim 1, wherein the second encryption bit is "1".

5. The system as claimed in claim 1, wherein the system key is saved as a file or in a memory device.

6. The system as claimed in claim 1, wherein the system key is provided by the program security utility.

7. The system as claimed in claim 6, wherein the system key and the application key are embedded keys of the crypto operating system.

8. The system as claimed in claim 1, wherein data access by an application of the second executable file is encrypted or decrypted utilizing the application key decrypted from the encrypted application key.

9. The system as claimed in claim 1, wherein the system key or the application key comprises an encryption key and a decryption key.

10. The system as claimed in claim 1, further comprising a process management system, wherein the program security utility and the process management system further designates the crypto operating system to the secure state.

11. The system as claimed in claim 10, wherein the crypto operating system in the secure state performs corresponding encryption or decryption operations for all output or input data of all applications.

12. An application-based data encryption method, comprising:

providing a system key, a first executable file, and a second executable file, wherein the first executable file comprises a first file header and a first program code and the first file header comprises a first encryption bit, and the second executable file comprises a second file header, a second program code, and an encrypted application key and the second file header comprises a second encryption bit;

providing a program security utility, further comprising:
a key generation model, providing an application key; and
a key encryption model, encrypting the application key utilizing the system key to generate the encrypted application key;

processing the first executable file to generate the second executable file using the program security utility; and decrypting the encrypted application key according to the system key using a crypto operating system, wherein the crypto operating system comprises a file management system, a crypto driver, and hardware driver and, when the file management system receives a write system call corresponding to an application, the method further comprises:

determining a file system to which a file to be written for the application belongs and then passing a write request to the determined file system using a virtual file system;

when the write request is received, calculating a specified address of the file to be written in a storage device based on a file information data structure corresponding to the application and passing the write request to the crypto driver using the file system;

the crypto driver receiving the write request from the file system, identifying an encryption bit of a process data structure corresponding to the application to determine whether the application is assigned a secure state, acquiring the application key from the process data structure if the application is assigned the secure state, and encrypting the file to be written utilizing the application key to generate an encrypted file; and retrieving the write request from the crypto driver and writing the encrypted file into the specified address of the storage device using the hardware driver.

13. The method as claimed in claim 12, wherein the first encryption bit is "0".

14. The method as claimed in claim 12, wherein the first executable file is a disk image file of an application not designated.

15. The method as claimed in claim 12, wherein the second encryption bit is "1".

16. The method as claimed in claim 12, wherein the system key is saved as a file or in a memory device.

17. The method as claimed in claim 12, wherein the system key is provided by the program security utility.

18. The method as claimed in claim 17, wherein the system key and the application key are embedded keys of the crypto operating system.

19. The method as claimed in claim 12, wherein data access by an application of the second executable file is encrypted or decrypted utilizing the application key decrypted from the encrypted application key.

20. The method as claimed in claim 12, wherein the system key or the application key comprises an encryption key and a decryption key.

21. The method as claimed in claim 12, wherein the crypto operating system is designated to the secure state using the program security utility.

22. The method as claimed in claim 21, wherein corresponding encryption or decryption operations are performed for all output or input data of all applications using the crypto operating system in the secure state.

23. The system as claimed in claim 1, wherein:
when the file management system receives a read system call corresponding to the application, the virtual file system of the file management system determines a file system to which the file belongs and then passes a read request to the determined file system;

when the read request is received, the file system calculates the specified address of the file in the storage device based on the file information data structure and passes the read request to crypto driver;

the crypto driver passes the read request to the hardware driver;

the hardware driver reads the file from storage device into a buffer cache;

the crypto driver identifies the encryption bit to determine whether the application is assigned the secure state, if the application is assigned the secure state, acquires the application key from the process data structure to decrypt the file, and passes the decrypted file to the file management system; and the file management system provides the decrypted file to the application.

24. The method as claimed in claim 12, further comprising:
determining a file system to which the file belongs and then passing a read request to the determined file system using the virtual file system when the file management system receives a read system call corresponding to the application;
calculating the specified address of the file in the storage device based on the file information data structure and passing the read request to crypto driver using the file system when the read request is received;
passing the read request to the hardware driver using the crypto driver;
reading the file from storage device into a buffer cache using the hardware driver;
identifying the encryption bit to determine whether the application is assigned the secure state, if the application is assigned the secure state, acquiring the application key from the process data structure to decrypt the file, and passing the decrypted file to the file management system using the crypto driver; and
providing the decrypted file to the application by the file management system.

\* \* \* \* \*

UNITED STATES PATENT AND TRADEMARK OFFICE
CERTIFICATE OF CORRECTION

PATENT NO. : 7,596,695 B2  Page 1 of 1
APPLICATION NO. : 10/981127
DATED : September 29, 2009
INVENTOR(S) : Liao et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 978 days.

Signed and Sealed this

Twenty-eighth Day of September, 2010

David J. Kappos
*Director of the United States Patent and Trademark Office*